United States Patent
Ramalingam et al.

(10) Patent No.: US 11,132,187 B2
(45) Date of Patent: Sep. 28, 2021

(54) BARE METAL PROVISIONING OF SOFTWARE DEFINED INFRASTRUCTURE

(71) Applicant: American Megatrends International, LLC, Duluth, GA (US)

(72) Inventors: Muthukkumaran Ramalingam, Duluth, GA (US); Chandrasekar Rathineswaran, Duluth, GA (US); Joseprabu Inbaraj, Suwanee, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 175 days.

(21) Appl. No.: 15/248,599

(22) Filed: Aug. 26, 2016

(65) Prior Publication Data

US 2018/0060051 A1 Mar. 1, 2018

(51) Int. Cl.
| | |
|---|---|
| G06F 9/445 | (2018.01) |
| H04L 29/08 | (2006.01) |
| G06F 8/61 | (2018.01) |
| G06F 9/455 | (2018.01) |

(52) U.S. Cl.
CPC ............ *G06F 8/61* (2013.01); *G06F 9/45541* (2013.01); *H04L 67/16* (2013.01); *H04L 67/34* (2013.01); *H04L 67/10* (2013.01)

(58) Field of Classification Search
CPC ....... G06F 8/61; G06F 9/45541; H04L 67/34; H04L 67/16

USPC ........................................................ 717/175
See application file for complete search history.

(56) References Cited

U.S. PATENT DOCUMENTS

| | | | | |
|---|---|---|---|---|
| 2005/0038808 | A1* | 2/2005 | Kutch | H04L 67/34 |
| | | | | 707/999.102 |
| 2009/0083733 | A1* | 3/2009 | Chen et al. | G06F 8/61 |
| | | | | 717/178 |
| 2009/0265701 | A1* | 10/2009 | Naslavsky et al. | G06F 8/61 |
| | | | | 717/172 |
| 2011/0246981 | A1* | 10/2011 | Braun et al. | G06F 9/44505 |
| | | | | 717/175 |
| 2013/0081008 | A1* | 3/2013 | Rangarajan et al. | G06F 8/61 |
| | | | | 717/168 |
| 2016/0328222 | A1* | 11/2016 | Arumugam et al. | G06F 8/61 |

\* cited by examiner

*Primary Examiner* — Qing Chen
*Assistant Examiner* — Mohammed N Huda
(74) *Attorney, Agent, or Firm* — Locke Lord LLP; Tim Tingkang Xia, Esq.

(57) ABSTRACT

In an aspect of the disclosure, a method, a computer-readable medium, and a computer system are provided. A first BMC of the computer system sends hardware information of a first host of the first BMC. The first BMC receives information of at least one program for installation on the first host. The first BMC emulates a media device to the first host. The first BMC requests the first host to install the at least one program provided through the emulated media device. The first BMC transfers the at least one program to the first host through the emulated media device.

17 Claims, 5 Drawing Sheets

BARE METAL PROVISIONING OF SOFTWARE DEFINED INFRASTRUCTURE

BACKGROUND

Field

The present disclosure relates generally to computer systems, and more particularly, to techniques of provisioning software components to a bare-metal machine to build a target server in a software defined infrastructure such as a cloud.

Background

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. A BMC may be considered as an embedded-system device.

In a public or private cloud environment (e.g., OPENSTACK, VMWARE VSPHERE, MICROSOFT AZURE), deploying a new hardware component may require substantial manual procedures, which include operating system installation, cloud component packages installation, and a sequence of configuration operations. Thus, there is a need for a mechanism to simplify the deployment process for converting a bare-metal machine into a functioning target server in a software defined infrastructure such as a cloud.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. A first BMC of the computer system sends hardware information of a first host of the first BMC. The first BMC receives information of at least one program for installation on the first host. The first BMC emulates a media device to the first host. The first BMC requests the first host to install the at least one program provided through the emulated media device. The first BMC transfers the at least one program to the first host through the emulated media device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a public or private cloud environment (e.g., OPENSTACK, VMWARE VSPHERE, MICROSOFT AZURE), deploying a new hardware component may require substantial manual procedures, which includes operating system installation, cloud component packages installation, and a sequence of configuration operations. Thus, there is a need for a mechanism to simplify the deployment process for converting a bare-metal machine into a functioning target server in a software defined infrastructure such as a cloud. The present disclosure describes a mechanism in which some or all of the tasks of provisioning software components to a bare-metal machine can be automated by using an out-of-band management processor (e.g., a BMC).

Figure 1:
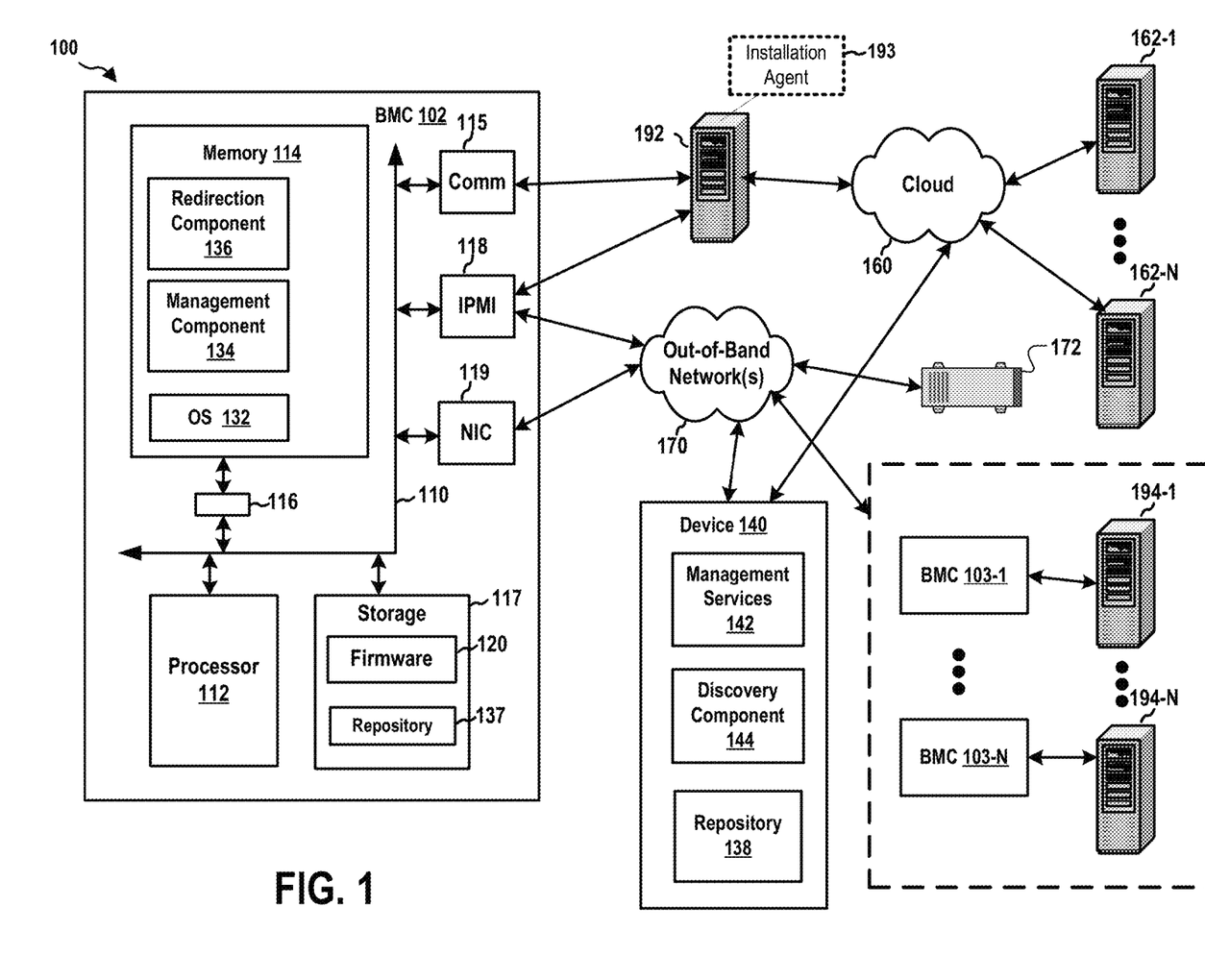
FIG. 1 is a diagram illustrating a computer system.

FIG. 1 is a diagram 100 illustrating a computer system. In this example, the computer system includes, among other devices, a BMC 102 and its host computer 192, BMCs 103-1 . . . 103-N and their hosts (i.e., bare-metal machines 194-1 . . . 194-N), a management device 140, a remote device 172, and a cloud 160 having cloud servers 162-1 . . . 162-N.

The BMC 102 has a processor 112, a memory 114, a memory driver 116, a storage 117, communication interface(s) 115, a repository 137, and a network interface card 119. Further, the BMC 102 may support IPMI and may have an IPMI interface 118. The IPMI interface 118 may be implemented over the communication interface(s) 115, which may include a keyboard controller style (KCS), a server management interface chip (SMIC), a block transfer (BT) interface, a system management bus system interface (SSIF), a Universal Serial Bus (USB) interface, a network interface (e.g., the network interface card 119), and/or other suitable communication interface(s). The memory 114, the processor 112, the memory driver 116, the storage 117, the communication interface(s) 115, the network interface card 119, and the IPMI interface 118 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an operating system (OS) 132, a redirection component 136, and a management component 134. The management component 134 may optionally receive and send IPMI messages through the IPMI interface 118.

Further, the redirection component 136 may emulate one or more media devices connected to the communication interface(s) 115. For example, the redirection component 136 may emulate a CD drive, a flash drive, a hard drive, a USB drive, etc. connected to the communication interface(s) 115.

The storage 117 may also include a repository 137 that is used to store OS images as described infra.

The BMC 102 may be in communication, through one or more of the communication interface described supra and/or through the IPMI interface 118, with the host computer 192, the management device 140, and/or the remote device 172. The BMC 102 may manage the host computer 192. The host computer 192 initially may be a bare-metal machine. A bare-metal machine may be a physical machine having a limited number of basic functionality programs (e.g., BIOS) but without an OS. The host computer 192 may further include an installation agent 193. As described infra, the BMC 102 may communicate with the installation agent 193 for installing one or more programs on the host computer 192.

Further, each of the BMCs 103-1 . . . 103-N may be similar to the BMC 102. For example, each of the BMCs 103-1 . . . 103-N may have similar components, including an OS 132, a management component 134, and a redirection component 136. Each of the BMCs 103-1 . . . 103-N may manage a corresponding one of the bare-metal machines 194-1 . . . 194-N, which may be similar to the host computer 192. Each of the bare-metal machines 194-1 . . . 194-N may also include an installation agent 193 that can be used to install one or more programs.

The communications among the BMC 102, the management device 140, and/or the remote device 172 may be carried over an out-of-band network 170. The out-of-band network 170 is out-of-band with respect to the networks of the cloud 160. That is, the out-of-band network 170 may not be part of the networks of the cloud 160. In this example, the BMC 102 may be in communication with the out-of-band network 170 through the network interface card 119.

The management device 140 has, among other components, management services 142, discovery component 144, and a repository 138. The management services 142 may manage one or more aspects of the cloud 160. For example, the management services 142 may determine whether the cloud servers 162-1 . . . 162-N have reached their capacities and a new server needs to be added to the cloud 160. The management services 142 may also determine the type of server (e.g., a storage server or a compute server) is needed in the cloud 160. The management services 142 may also determine the type of server (or other system) to be built on a bare-metal machine in consideration of the hardware capability of the bare-metal machine.

The management services 142 may utilize the discovery component 144 to discover BMCs in the out-of-band network 170. That is, the management services 142 may discover the BMCs 103-1 . . . 103-N and, accordingly, the bare-metal machines 194-1 . . . 194-N managed by the BMCs 103-1 . . . 103-N. Thus, the management services 142 may build target servers on the bare-metal machines 194-1 . . . 194-N. In particular, the management services 142 may obtain hardware information of the bare-metal machines 194-1 . . . 194-N from the BMCs 103-1 . . . 103-N and may select, based on the hardware requirements of a target server, a particular bare-metal machine from the bare-metal machines 194-1 . . . 194-N to build the type of server needed in the cloud 160. The management services 142 may provide or indicate the programs that need to be installed on the selected bare-metal machine in order to build the target server. The programs may include an OS image and other software packages (e.g., cloud software packages). Those programs may be stored in the repository 138 of the management device 140, a repository of the remote device 172, other places in the networks, or over the Internet. The management services 142 can instruct the BMC managing the selected bare-metal machine to redirect (e.g., via media redirection) the programs to the selected bare-metal machine. As such, the installation agent 193 on the selected bare-metal machine may install the programs to build the target server.

Figure 2:
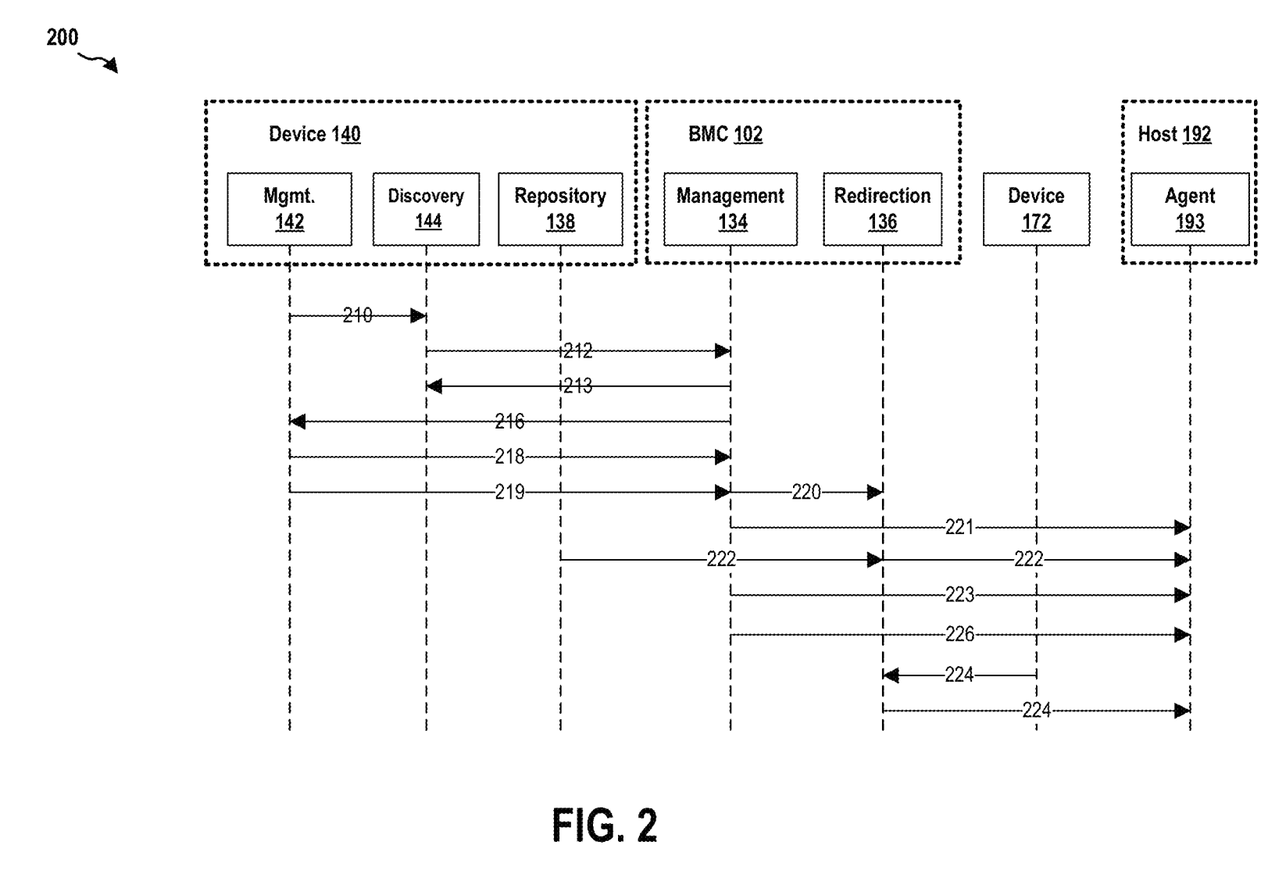
FIG. 2 is a diagram illustrating a sequence of operations for building a target server.

FIG. 2 is a diagram 200 illustrating a sequence of operations for building a target server. As described supra, the management services 142 of the management device 140 may manage the cloud 160. The management device 140 may determine, or may be instructed, to add another cloud server to the cloud 160. For example, the management services 142 may monitor the remaining capacities of the cloud servers 162-1 . . . 162-N. Based on the needs, the management services 142 may decide to add a target server (e.g., a storage server or a compute server) to the cloud 160.

Accordingly, the management services 142 may decide to select a bare-metal machine to build the target server (i.e., to provision the required programs to the selected bare-metal machine). More specifically, the management services 142 may send an instruction 210 to the discovery component 144, requesting the discovery component 144 to discover bare-metal machines for building the target server. The discovery component 144, in turn, may send messages 212 in the out-of-band network 170 to discover BMCs in the out-of-band network 170. For example, the discovery component 144 may send Remote Management and Control Protocol (RMCP) ping messages towards an IP address or a range of IP addresses to discover the BMCs. Alternatively, the messages 212 may be messages (e.g., handshake messages) exchanged in an association procedure between the management device 140 and the BMCs.

In this example, the BMC 102 receives the messages 212. The management component 134 of the BMC 102 may send a response message 213 to the discovery component 144 of the management device 140. Similarly, the BMCs k103-1 . . . 103-N may send messages 213 to the management device 140. As such, the management device 140 is able to discover the BMC 102 and the BMCs 103-1 . . . 103-N as well as the host computer 192 and the bare-metal machines 194-1 . . . 194-N managed by those BMCs.

Further, the messages 212 may also request the recipient BMCs to report hardware information to the management device 140. Alternatively, the management services 142 may send another message to the discovered BMCs, requesting the BMCs to report hardware information to the management device 140. In this example, the management component 134 of the BMC 102 may obtain the hardware information of the host computer 192 (which is managed by the BMC 102). The hardware information may include specifications (e.g., capacity, size, etc.) of the processor, memory, disk drive, and other hardware components of the host computer 192, as well as the MAC address and/or IP address of the host computer 192. The management component 134 may send a message 216 containing the hardware information to the management services 142. Similarly, the BMCs 103-1 . . . 103-N may send messages 216 containing hardware information of the bare-metal machines 194-1 . . . 194-N to the management component 134.

After the management services 142 receive the hardware information of the bare-metal machines (i.e., the hosts) managed by the discovered BMCs, the management services 142 may select a bare-metal machine to build the target server. The selection may be made based on the hardware requirements of the target server. In this example, the management services 142 select the host computer 192. In certain configurations, the management services 142 may decide to use some or all of the bare-metal machines to build cloud servers.

More specifically, in certain configurations, administrators may choose, via the management device 140, the best suitable bare-metal machine (e.g., the bare-metal machine 194-1) and may initiate the provisioning of the bare-metal machine by requesting the BMC (e.g., the BMC 103-1) managing the chosen bare-metal machine after choosing appropriate OS image and software packages. Since the managing BMC (e.g., BMC 103-1) and the selected bare-metal machine (e.g., the bare-metal machine 194-1) are interrelated, any action to the BMC will be carried out on the bare-metal machine.

In certain configurations, the selection of a bare-metal machine or programs can also be automated by certain validation techniques of the management services 142 implemented through, for example, hardware policy templates. Hardware policy templates are the pre-determined hardware information defined by administrators to decide what type of server (e.g., a compute server or a storage server) is to be provisioned of a particular bare-metal machine. As soon as the discovery component 144 discovers the particular bare-metal machine, the management services 142 can determine the appropriate (or suggest to the administrators) appropriate OS images and software packages that can be installed on the particular bare-metal machine. For example, if the particular bare-metal machine is processor intensive (e.g., with more processing power and memory), the particular bare-metal machine can be deployed as a compute server for the cloud 160. If the particular bare-metal machine is (e.g., with more disk space, etc.), the particular bare-metal machine can be deployed as a storage server for the cloud 160.

In this example, the management services 142 may determine one or more programs to be installed on the host computer 192 (which at the time is a bare-metal machine) in order to build a target server. That is, the management services 142 may have determined that a particular type of server is needed in the cloud 160. The management services 142 can then accordingly decide the required programs for the particular type of server. In some other examples, the management services 142 may determine a target server to be built on a particular bare-metal machine based on the hardware information of the particular bare-metal machine. For example, the management services 142 may determine the type of server that can be supported by the hardware of the particular bare-metal machine.

The programs used to build the target server may include a customized OS image and other software packages required for deploying the target server. The management services 142 may also determine where the programs are stored. In this example, the OS image may be stored in the repository 138 of the management device 140; the software packages may be stored in the repository of the remote device 172.

The management services 142 then send a message 218 to the management component 134 of the BMC 102. The message 218 indicates to the BMC 102 the identity of the programs to be installed on the host computer 192 and the location of the programs. In this example, the message 218 indicates that the OS image is stored in the repository 138 of the management device 140 and the software packages are stored on the remote device 172. The message 218 may further instruct the BMC 102 to redirect the OS image to the host computer 192. The message 218 may also instruct the BMC 102 to request the host computer 192 to prepare instructions (e.g., post-install scripts) to obtain the software packages from the remote device 172 through media redirection (or from the cloud 160 or the Internet through direct download in other examples) and to install the software packages.

The repositories at the management device 140 and the remote device 172 may have one or more OS images that are customized for different software components required in the cloud 160. Software packages can be stored in the management device 140, the remote device 172, or in the cloud 160. An OS image is customized (e.g., via post-install scripts) to install necessary software packages that can be stored in different locations (e.g., the management device 140, the remote device 172, or the cloud 160).

In other examples, the OS image may be stored in the repository 138 of the BMC 102. Further, the storage 117 may represent one or more storage devices, including a Secure Digital (SD) card attached to the BMC 102. The repository 138 may be in any one of the one or more storage devices and, in particular, may be in the SD card. That is, the OS image may be stored in the SD card.

The management services 142 may send a message 219 to the management component 134 to request the BMC 102 to redirect the programs. The management component 134 sends an instruction 220 to the redirection component 136, instructing the redirection component 136 to redirect the selected OS image stored in the repository 138 to the host computer 192. Further, if the host computer 192 is not powered on, the management component 134 sends a signal 221 to the host computer 192 to power on the host computer 192.

The redirection component 136 emulates a media device through the communication interface(s) 115 to the host computer 192. In particular, the redirection component 136 may emulate a USB storage device. Therefore, (after the host computer 192 is powered on,) the host computer 192 (e.g., via the installation agent 193) may detect the emulated media device. The redirection component 136 also establishes a communications link (e.g., a Transmission Control Protocol (TCP) link) with the repository 138 for transferring an OS image 222 (i.e., the OS image selected by the management services 142 for building the target server). The redirection component 136 exposes the OS image 222 to the host computer 192 through the emulated storage device. From the host computer 192 perspective, the host computer 192 detects the emulated storage device as a physical storage device and identifies that the OS image 222 is stored in that storage device.

In certain configurations, installations of certain software packages may be pre-configured in the OS image itself. For example, post-install actions (e.g., via post-install scripts included in the OS image) subsequent to the OS installation can install and configure necessary software components without any user actions (unattended installation).

In certain configurations, as described supra, the message 218 received by the management component 134 may indicate certain software packages 228 also to be installed on the host computer 192. The management component 134 may send a message 223 including information regarding the software packages 228 to the installation agent 193 of the host computer 192. The installation agent 193 may accordingly implement post-install actions (e.g., generate post-install scripts) to install the software packages 228.

The management component 134 sends a message 226 to the installation agent 193 of the host computer 192. The message 226 requests the installation agent 193 to install the OS image 222 made available in the storage device emulated by the redirection component 136. After the OS image 222 is installed on the host computer 192, in one example, the post-install action of the host computer 192 may request the redirection component 136 to redirect the software packages, of those indicated in the pre-configuration in the OS image 222 and of the software packages 228 indicated in the message 223, that are stored on the management device 140 or the remote device 172 to the host computer 192 for installation. The redirection component 136 may push the software packages from the remote device 172 or the management device 140 to the host computer 192. Further, some software packages may be stored in the cloud 160 or the Internet, and the host computer 192 may obtain those software packages directly from the cloud 160 or the Internet through direct download for installation.

As such, the installation agent 193 installs the required programs to build the target server. One the target server is built, the management services 142 may add the target server to the cloud 160.

Figure 3:
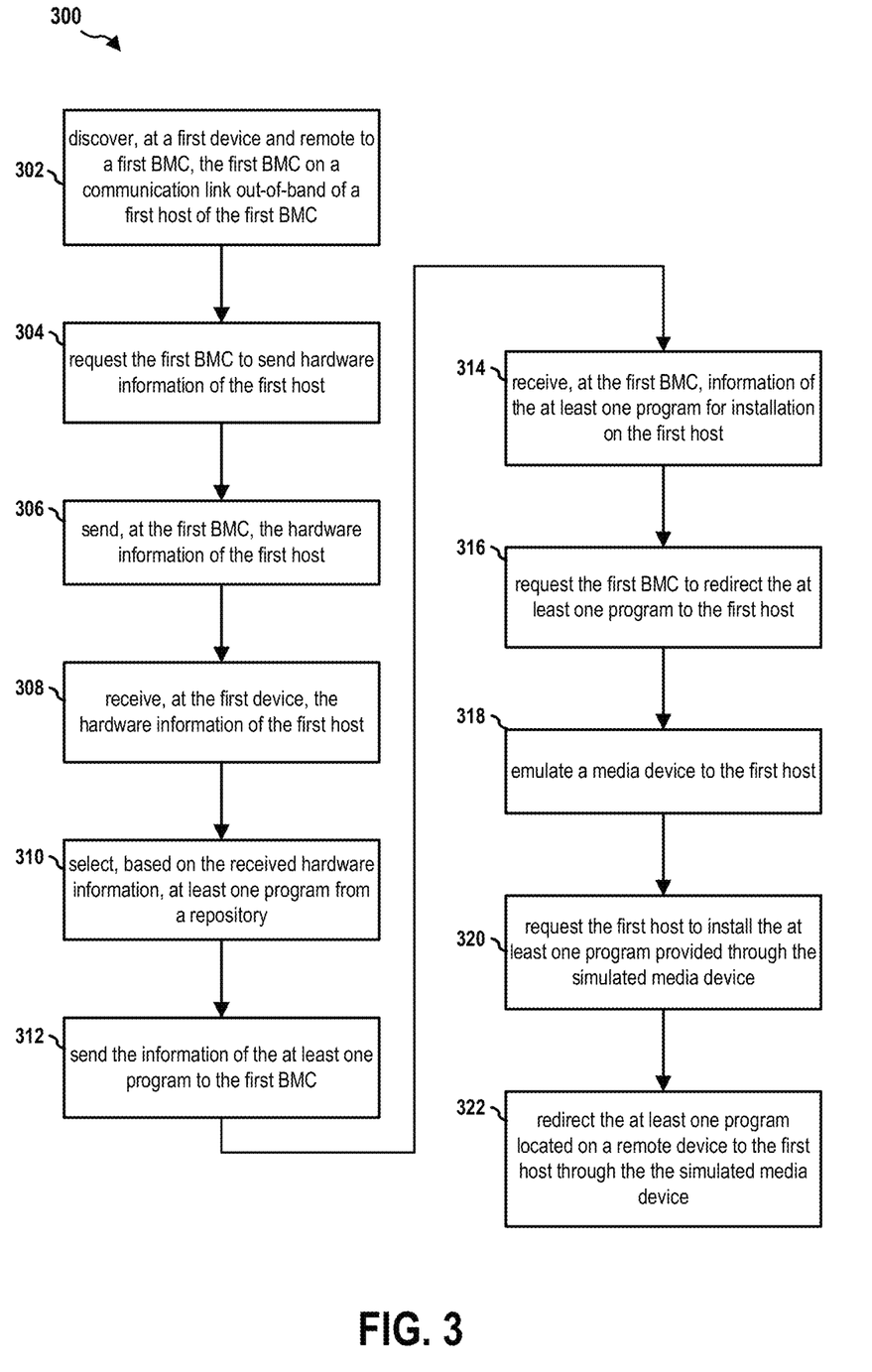
FIG. 3 is a flow chart of a method (process) for building a target server.

FIG. 3 is a flow chart 300 of a method (process) for building a target server. The method may be performed by a first BMC (e.g., any of the BMC 102, the BMCs 103-1 ... 103-N, and the apparatus 102') and a first device (e.g., the management device 140) of a computer system.

At operation 302, the first device, which is remote to the first BMC, discovers (e.g., via the messages 212) the first BMC on a communication link out-of-band (e.g., in the out-of-band network 170) of a network of machines (e.g., the cloud 160). At operation 304, the first device requests (e.g., via the messages 212) the first BMC to send hardware information of a first host (e.g., the host computer 192) of the first BMC. At operation 306, the first BMC sends (e.g., via the message 216) the hardware information of the first host to the first device. At operation 308, the first device receives the hardware information of the first host of the first BMC. At operation 310, the first device selects, based on the received hardware information, at least one program (e.g., the OS image 222 and the software packages 228) from a repository (the repository 138 or the remote device 172). At operation 312, the first device sends (e.g., via the message 218) information of the at least one program to the first BMC.

At operation 314, the first device receives the information of at least one program for installation on the first host. At operation 316, the first device requests (via the message 219) the first BMC (e.g., via the redirection component 136) to redirect the at least one program to the first host. At operation 318, the first BMC (via the redirection component 136) emulates a media device to the first host. At operation 320, the first BMC requests (e.g., via the message 226) the first host to install the at least one program provided through the emulated media device. Subsequently, the first BMC transfers the at least one program to the first host through the emulated media device. More specifically, in certain configurations, the first BMC, at operation 322, redirects the at least one program located on a remote device (e.g., the management device 140 or the remote device 172) to the first host through the emulated media device. In certain configurations, the at least one program includes an operating system (OS) image and one or more software packages.

In certain configurations, the first BMC is one of a plurality of BMCs (e.g., the BMC 102 and the BMCs 103-1 . . . 103-N) discovered out-of-band by the first device. The first device also receives hardware information of a host of each of the plurality of BMCs other than the first BMC (e.g., the bare-metal machines 194-1 . . . 194-N). The first device obtains information of a type of a target machine to be added in a network of machines. The first device selects, based on the type of the target machine and hardware information of the hosts of the plurality of BMCs, the first host from the hosts of the plurality of BMCs to build the target machine. The target machine in built by the installing the at least one program on the first host. The first device adds the target machine built on the first host to the network of machines.

Figure 4:
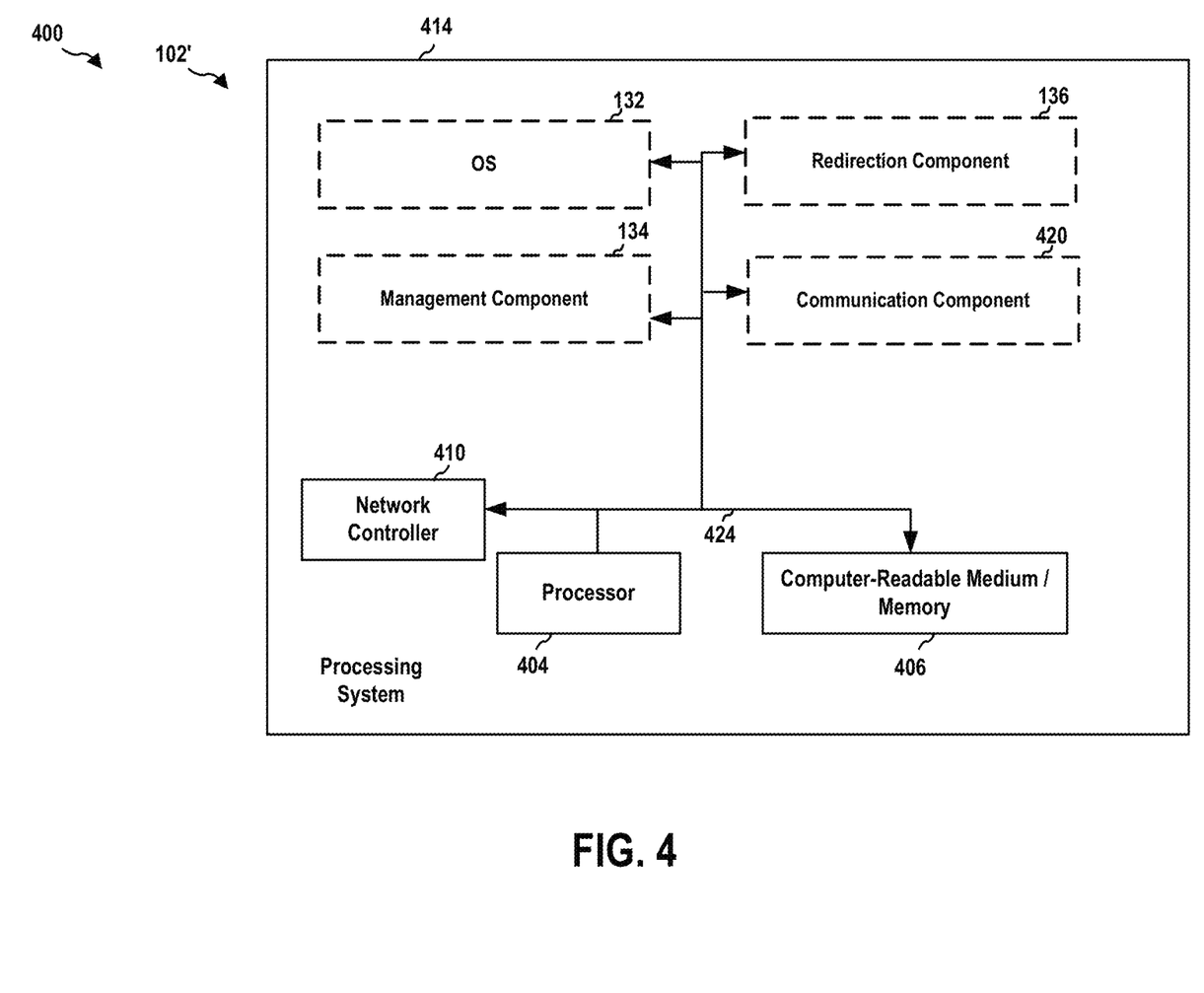
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102 and the BMCs 103-1 . . . 103-N. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the OS 132, the management component 134, the redirection component 136, and the computer-readable medium/memory 406. In particular, the computer-readable medium/memory 406 may include the memory 114 and the storage 117. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the OS 132, the management component 134, the redirection component 136. The components may be software components running in the processor 404, resident/stored in the computer readable medium/memory 406, one or more hardware components coupled to the processor 404, or some combination thereof.

The apparatus 102' may be configured to include means for performing certain operations described supra referring to FIG. 3. The aforementioned means may be one or more of the aforementioned components of the apparatus 102' and/or the processing system 414 of the apparatus 102' configured to perform the functions recited by the aforementioned means.

Figure 5:
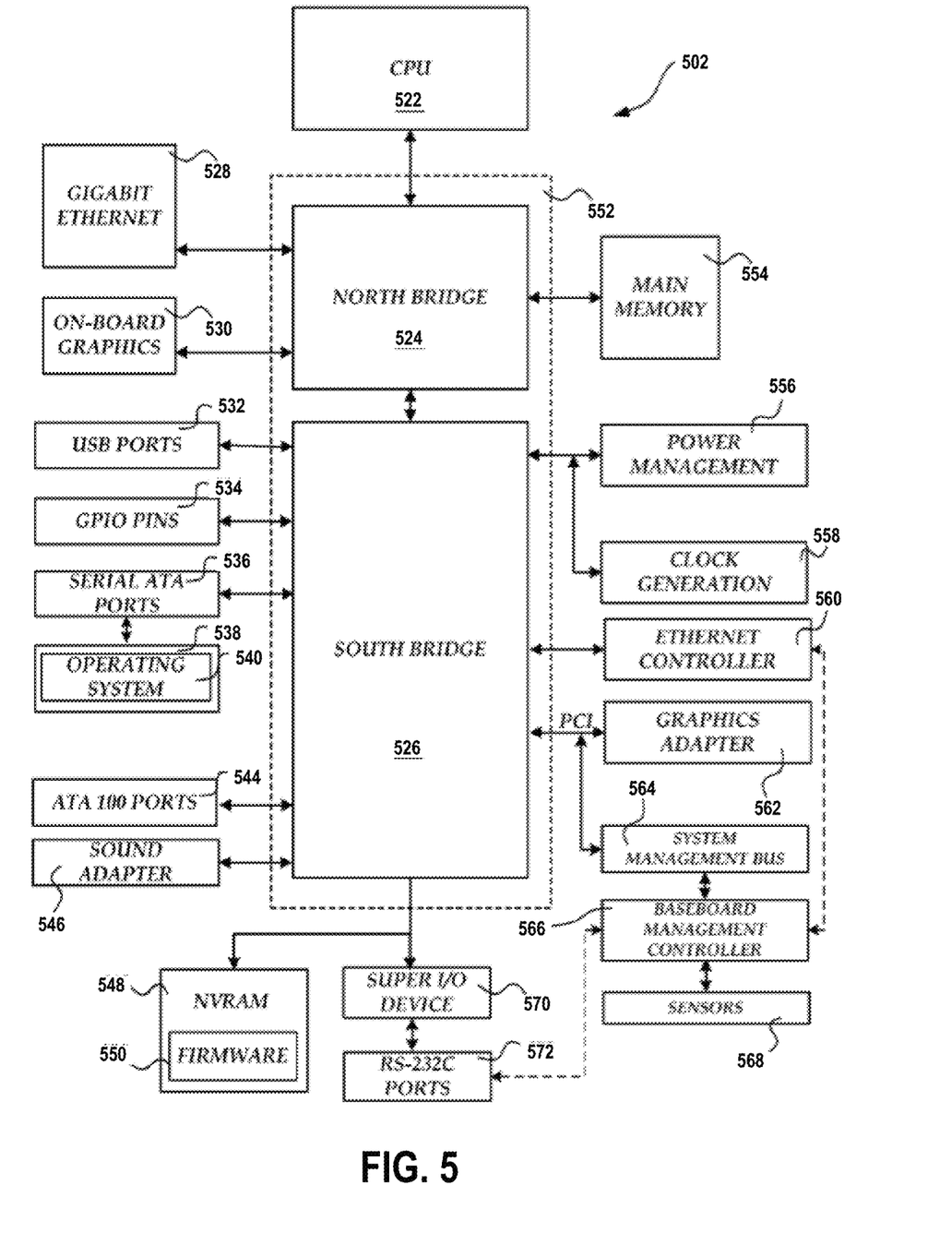
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 192, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count ("LPC") interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including hand-held computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a computer system, comprising:
    sending, at a first baseboard management controller (BMC) of the computer system, hardware information of a first host of the first BMC, wherein the first host is a bare-metal machine without an operating system (OS) and including an installation agent;
    receiving, at the first BMC, information of at least one program for installation on the first host, wherein the at least one program includes an OS image and one or more software packages;
    emulating, by the first BMC, a media device to the first host;
    requesting, by the first BMC, the first host to install the OS image and the one or more software packages of the at least one program provided through the emulated media device; and
    transferring, by the first BMC, the OS image and the one or more software packages of the at least one program to the first host through the emulated media device, wherein the installation agent on the bare-metal machine installs the OS image and the one or more software packages of the at least one program on the bare-metal machine to build, on the first host as the bare-metal machine, a target machine in a network of machines.

2. The method of claim 1, wherein the transferring the OS image and the one or more software packages of the at least one program to the first host comprises:
    redirecting the OS image and the one or more software packages of the at least one program located on a remote device to the first host through the emulated media device.

3. The method of claim 1, further comprising:
    discovering, at a first device of the computer system and remote to the first BMC and the first host, the first BMC on a communication link out-of-band of the network of machines; and
    requesting, by the first device, the first BMC to send hardware information of the first host of the first BMC.

4. The method of claim 3, further comprising:
    receiving, at the first device, the hardware information of the first host of the first BMC;
    selecting, at the first device based on the received hardware information, the at least one program from a repository;
    sending, by the first device, information of the OS image and the one or more software packages of the at least one program to the first BMC; and
    requesting, by the first device, the first BMC to redirect the at least one program to the first host.

5. The method of claim 3, wherein the first BMC is one of a plurality of BMCs discovered out-of-band by the first device, the method further comprising:
    receiving, at the first device, hardware information of a host of each of the plurality of BMCs other than the first BMC;
    obtaining information of a type of the target machine to be added in the network of machines; and
    selecting, based on the type of the target machine and hardware information of the hosts of the plurality of BMCs, the first host from the hosts of the plurality of BMCs to build the target machine, wherein the target machine is built by the installing the at least one program on the first host.

6. The method of claim 5, further comprising adding the target machine built on the first host to the network of machines.

7. A computer system, comprising:
    a memory; and
    at least one processor coupled to the memory and configured to:
        send, at a first baseboard management controller (BMC) of the computer system, hardware information of a first host of the first BMC, wherein the first host is a bare-metal machine without an operating system (OS) and including an installation agent;
        receive, at the first BMC, information of at least one program for installation on the first host, wherein the at least one program includes an OS image and one or more software packages;
        emulate, by the first BMC, a media device to the first host;
        request, by the first BMC, the first host to install the OS image and the one or more software packages of the at least one program provided through the emulated media device; and
        transfer, by the first BMC, the OS image and the one or more software packages of the at least one program to the first host through the emulated media device, wherein the installation agent on the bare-metal machine installs the OS image and the one or more software packages of the at least one program on the bare-metal machine to build, on the first host as the bare-metal machine, a target machine in a network of machines.

8. The computer system of claim 7, wherein to transfer the OS image and the one or more software packages of the at least one program to the first host, the at least one processor is further configured to:
    redirect the OS image and the one or more software packages of the at least one program located on a remote device to the first host through the emulated media device.

9. The computer system of claim 7, wherein the at least one processor is further configured to:
    discover, at a first device of the computer system and remote to the first BMC and the first host, the first BMC on a communication link out-of-band of the network of machines; and
    request, by the first device, the first BMC to send hardware information of the first host of the first BMC.

10. The computer system of claim 9, wherein the at least one processor is further configured to:
    receive, at the first device, the hardware information of the first host of the first BMC;
    select, at the first device based on the received hardware information, the at least one program from a repository;
    send, by the first device, information of the OS image and the one or more software packages of the at least one program to the first BMC; and request, by the first device, the first BMC to redirect the at least one program to the first host.

11. The computer system of claim 9, wherein the first BMC is one of a plurality of BMCs discovered out-of-band by the first device, wherein the at least one processor is further configured to:
receive, at the first device, hardware information of a host of each of the plurality of BMCs other than the first BMC;
obtain information of a type of the target machine to be added in the network of machines; and
select, based on the type of the target machine and hardware information of the hosts of the plurality of BMCs, the first host from the hosts of the plurality of BMCs to build the target machine, wherein the target machine is built by the installing the at least one program on the first host.

12. The computer system of claim 11, wherein the at least one processor is further configured to add the target machine built on the first host to the network of machines.

13. A non-transitory computer-readable medium storing computer executable code for operating a computer system, comprising code to:
send, at a first baseboard management controller (BMC) of the computer system, hardware information of a first host of the first BMC, wherein the first host is a bare-metal machine without an operating system (OS) and including an installation agent;
receive, at the first BMC, information of at least one program for installation on the first host, wherein the at least one program includes an OS image and one or more software packages;
emulate, by the first BMC, a media device to the first host;
request, by the first BMC, the first host to install the OS image and the one or more software packages of the at least one program provided through the emulated media device; and
transfer, by the first BMC, the OS image and the one or more software packages of the at least one program to the first host through the emulated media device, wherein the installation agent on the bare-metal machine installs the OS image and the one or more software packages of the at least one program on the bare-metal machine to build, on the first host as the bare-metal machine, a target machine in a network of machines.

14. The non-transitory computer-readable medium of claim 13, wherein to transfer the OS image and the one or more software packages of the at least one program to the first host, the code is further configured to:
redirect the OS image and the one or more software packages of the at least one program located on a remote device to the first host through the emulated media device.

15. The non-transitory computer-readable medium of claim 13, wherein the code is further configured to:
discover, at a first device of the computer system and remote to the first BMC and the first host, the first BMC on a communication link out-of-band of the network of machines; and
request, by the first device, the first BMC to send hardware information of the first host of the first BMC.

16. The non-transitory computer-readable medium of claim 15, wherein the code is further configured to:
receive, at the first device, the hardware information of the first host of the first BMC;
select, at the first device based on the received hardware information, the at least one program from a repository;
send, by the first device, information of the OS image and the one or more software packages of the at least one program to the first BMC; and
request, by the first device, the first BMC to redirect the at least one program to the first host.

17. The non-transitory computer-readable medium of claim 15, wherein the first BMC is one of a plurality of BMCs discovered out-of-band by the first device, wherein the code is further configured to:
receive, at the first device, hardware information of a host of each of the plurality of BMCs other than the first BMC;
obtain information of a type of the target machine to be added in the network of machines;
select, based on the type of the target machine and hardware information of the hosts of the plurality of BMCs, the first host from the hosts of the plurality of BMCs to build the target machine, wherein the target machine is built by the installing the at least one program on the first host; and
add the target machine built on the first host to the network of machines.

* * * * *